United States Patent [19]

Foti

[11] Patent Number: 6,067,454

[45] Date of Patent: May 23, 2000

[54] MOBILE SWITCHING CENTER RESTART RECOVERY PROCEDURE

[75] Inventor: George Foti, Dollard des Ormeaux, Canada

[73] Assignee: Telefonaktiebolaget LM Ericsson (publ), Stockholm, Sweden

[21] Appl. No.: 09/060,174

[22] Filed: Apr. 14, 1998

[51] Int. Cl.[7] .................................................. H04Q 7/20
[52] U.S. Cl. .......................................... 455/433; 455/423
[58] Field of Search .................................. 455/8, 9, 433, 455/423, 424, 67.1, 560

[56] References Cited

U.S. PATENT DOCUMENTS

| | | | |
|---|---|---|---|
| 5,479,481 | 12/1995 | Koivunen | 455/422 |
| 5,490,201 | 2/1996 | Moberg et al. | 455/433 |
| 5,509,118 | 4/1996 | Tuulos et al. | 395/182.14 |
| 5,537,457 | 7/1996 | Lantto et al. | 379/58 |
| 5,561,854 | 10/1996 | Antic et al. | 455/56.1 |
| 5,594,942 | 1/1997 | Antic et al. | 455/423 |
| 5,721,918 | 2/1998 | Nilsson et al. | 707/202 |
| 5,931,955 | 8/1999 | Kung | 714/15 |
| 5,937,343 | 8/1999 | Leung | 455/403 |
| 5,966,713 | 10/1999 | Carlsund et al. | 707/200 |

FOREIGN PATENT DOCUMENTS

WO 96/29838  9/1996  WIPO .

Primary Examiner—Reinhard J. Eisenzopf
Assistant Examiner—Charles N. Appiah
Attorney, Agent, or Firm—Smith & Danamraj, P.C.

[57] ABSTRACT

A method of recovering from a restart procedure in a mobile switching center (MSC) in a radio telecommunications network having a home location register (HLR) that maintains subscriber profiles and a MSC that maintains temporary subscriber records associated with the subscriber profiles in the HLR. The MSC maintains the temporary subscriber records in the MSC during the restart procedure, and flags each temporary subscriber record in the MSC that went through the restart. The HLR flags each subscriber profile in the HLR that fails an attempt to update an associated temporary subscriber record in the MSC during the restart procedure. When an access attempt is received in the MSC that requires use of a temporary subscriber record that is flagged, the MSC requests the HLR to send any changes to the flagged temporary subscriber record. The HLR then determines whether the subscriber profile associated with the flagged temporary subscriber record in the MSC is flagged in the HLR. If the subscriber profile is not flagged, the HLR sends a message to the MSC indicating that there are no changes to the flagged temporary subscriber record. However, if the subscriber profile in the HLR is flagged, the HLR sends to the MSC, the changes stored in the flagged profile which then update the flagged temporary subscriber record in the MSC. The flagged subscriber profile and the flagged temporary record are then reset.

10 Claims, 3 Drawing Sheets

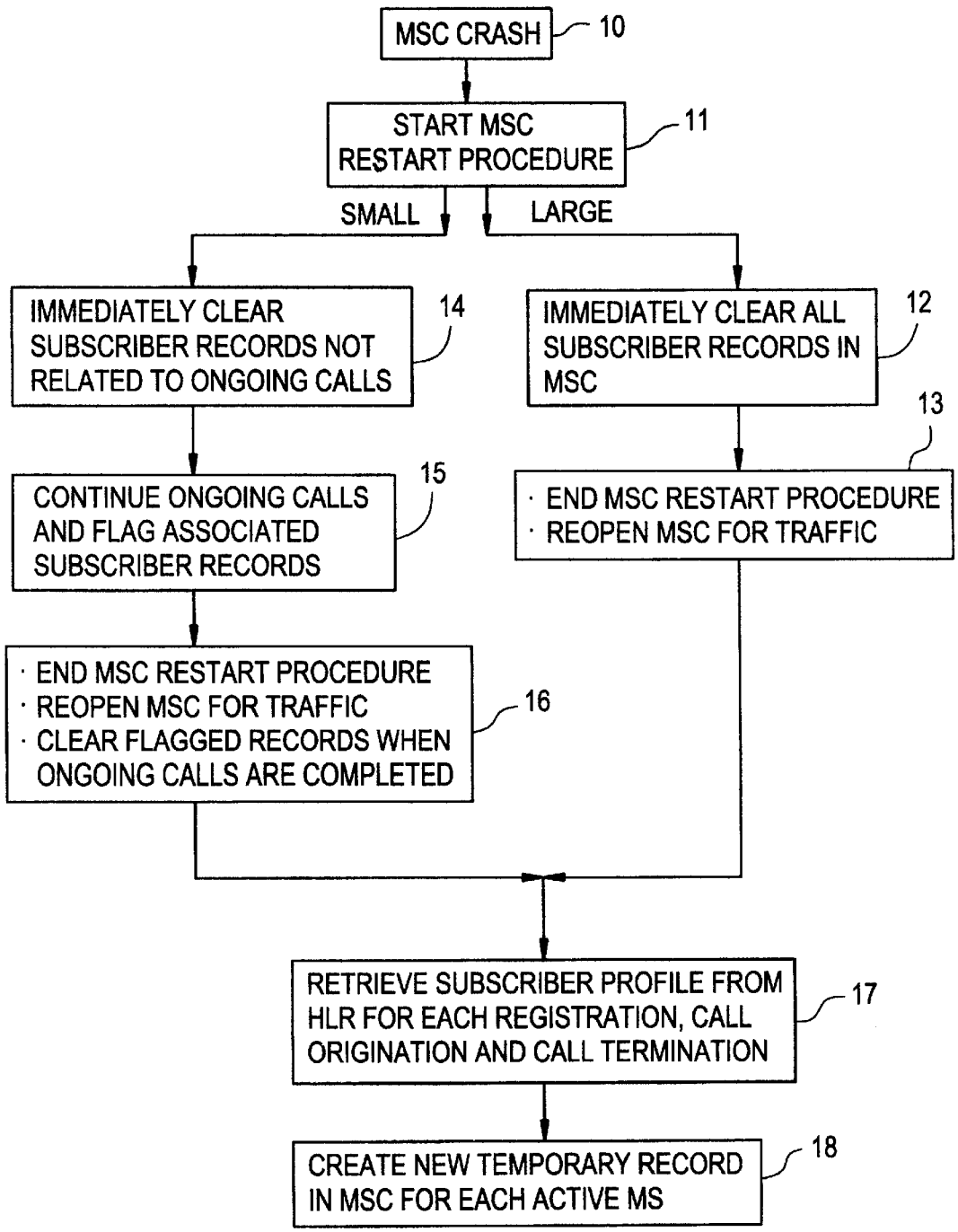

MOBILE SWITCHING CENTER RESTART RECOVERY PROCEDURE

BACKGROUND OF THE INVENTION

1. Technical Field of the Invention

This invention relates to telecommunication systems and, more particularly, to a procedure for recovering from a mobile switching center (MSC) restart in a radio telecommunications network.

2. Description of Related Art

Every roaming subscriber has a temporary subscriber record in the MSC currently serving the subscriber's mobile station. The temporary subscriber record includes information regarding the subscriber's services, profile, and mobility. These records are downloaded from the subscriber database in the HLR. When the subscriber registers in the serving MSC, the serving MSC creates a temporary roaming record for the subscriber. A registration notification message is sent from the serving MSC to the HLR, and the HLR downloads the subscriber profile to the temporary record in the MSC. The subscriber profile information is maintained in the temporary record as long as the subscriber is roaming there. Currently, MSCs may hold up to 120,000 records, but this number is scheduled to increase.

On occasion, the MSC may crash. This can be due to software application errors or data corruption cases, with severe service disruption consequences. Manual intervention may be required to refresh the MSC memory. The MSC then goes through a restart routine which is similar to rebooting a PC. There are two types of restarts: a small restart and a large restart. During a small restart, any ongoing calls are maintained. The temporary subscriber records associated with the ongoing calls are marked for deletion, and the records are deleted when the ongoing call is completed. All other temporary subscriber records in the MSC are cleared immediately. During a large restart, all of the temporary subscriber records in the MSC are cleared immediately, including subscriber records associated with ongoing calls.

Thus, when the MSC goes through either a small or a large restart, all of the temporary subscriber records are cleared. The records are cleared during the restart procedure because they may not be correct following the 1 to 1.5 minutes that the MSC was down. Category updates as well as location cancellation messages may have been missed by the MSC during the restart. System operators may have made changes to a subscriber's categories in the HLR. In such a case, if the subscriber is active and roaming, the HLR normally sends a Qualification Directive (QUALDIR) message to the serving MSC to update the temporary record. However, the temporary record cannot be updated while the MSC is performing a restart, thus creating an inconsistency between the subscriber profile in the HLR and the temporary subscriber record in the MSC. This can lead to a partial loss of service.

Mobile stations may also have entered or left the service area of the MSC. Thus, there may be an inconsistency between the subscriber location in the HLR and the actual location of the mobile station. As a consequence, a subscriber who has roamed to a border MSC, for example, may be lost for an extended period of time. To prevent these potential problems, the temporary records are cleared and new records are created at the subscriber's first access to the system following the restart so that there are no inconsistencies. This simple solution to clear all the records and start over worked well when a relatively small number of records were involved, but it is now a major problem when 120,000 or more records may be maintained in the MSC.

As noted above, restart may be initiated manually by the system operator or automatically if system events dictate. The restart takes approximately 1 to 1.5 minutes to complete, depending on the exchange size. During the restart, subscribers cannot make or receive new calls. When the MSC reopens to traffic, there is often a flood of registrations and call tic that can increase the normal load on the MSC by up to 800 percent. This increased load can continue for an extended period of time due to the buildup of unregistered mobile stations and repeated call attempts. This results in service degradation and processing inefficiency as a substantial portion of the processor's capacity is being utilized to shed calls.

The increased load following a restart may be caused by several factors. First, the number of mobile stations registering may increase by up to 25 times over the number of mobile stations that would normally register during the time frame immediately following the restart. During normal operation, the MSC broadcasts a registration ID every 4.83 seconds, for periodic registrations. The registration ID includes a time value, and mobile stations receive the ID signal and compare the time value to an internal value to determine if it is time to register. During a restart, the periodic registration ID is not broadcast for approximately 1.5 minutes. Mobile stations which would have registered during that time postpone their registrations. When the switch opens up to traffic, and the registration ID is again broadcast, there is a flood of registrations.

The second factor affecting the load on the MSC following a restart is a large increase in the number of call attempts. Many calls may have been attempted during the restart, and when the MSC reopens to traffic, there may be a flood of calls to and from mobile stations in the MSC's service area. For each attempted call and each registration, the MSC must send a Registration Notification (REGNOT) message to the HLR, fetch the associated subscriber profile, and create a new temporary record. This leads to a massive increase in load on the MSC, and heavy signaling traffic between the MSC and the HLR as the deleted temporary subscriber records are replaced.

Although there are no known prior art teachings of a solution to the aforementioned deficiency and shortcoming such as that disclosed herein, U.S. Pat. No. 5,561,854 to Antic et al. (Antic) discusses subject matter that bears some relation to matters discussed herein. Antic discloses a method for restoring a home location register after a HLR crash in which all the subscriber records in the HLR have been lost. Antic loads previously saved backup records into the register in the HLR unit. The backup records may come from the temporary subscriber records in visitor location registers (VLRs) in visited MSCs. Antic, however, does not teach or suggest a method of recovering from a MSC restart in a radio telecommunications network which significantly reduces the processing load in the MSC, and reduces the signaling and data transfer requirements between the MSC and the HLR.

Review of the foregoing reference reveals no disclosure or suggestion of a system or method such as that described and claimed herein.

In order to overcome the disadvantage of existing solutions, it would be advantageous to have a method of recovering from a MSC restart in a radio telecommunications network which significantly reduces the processing load in the MSC, and reduces the signaling and data transfer requirements between the MSC and the HLR. The present invention provides such a method.

SUMMARY OF THE INVENTION

In one aspect, the present invention is a method of recovering from a restart procedure in a mobile switching center (MSC) in a radio telecommunications network. The network includes a home location register (HLR) that maintains subscriber profiles and a MSC that maintains temporary subscriber records for roaming subscribers in the service area of the MSC. These temporary subscriber records are associated with the subscriber profiles in the HLR. The method comprises the steps of maintaining the temporary subscriber records in the MSC during the restart procedure, identifying temporary subscriber records that went through the restart procedure, identifying subscriber profiles in the HLR that failed attempts to update associated temporary subscriber records in the MSC during the restart procedure, and updating only the identified temporary subscriber records from the identified subscriber profiles after the restart procedure is completed. The method may also include the step of notifying the MSC that there are no changes to an identified temporary subscriber record in the MSC, upon determining that the associated subscriber profile in the HLR is not an identified profile.

In another aspect, the present invention is a method of recovering from a restart procedure in a mobile switching center (MSC) in a radio telecommunications network. The network includes a home location register (HLR) that maintains subscriber profiles and a MSC that maintains temporary subscriber records for roaming subscribers in the service area of the MSC. These temporary subscriber records are associated with the subscriber profiles in the HLR. The method includes the steps of flagging each subscriber profile in the HLR that fails an attempt to update an associated temporary subscriber record in the MSC during the restart procedure, maintaining the temporary subscriber records in the MSC during the restart procedure, and flagging each temporary subscriber record in the MSC that went through the restart procedure. The method also includes receiving an access attempt in the MSC that requires use of a temporary subscriber record that is flagged in the MSC, sending a message from the MSC to the HLR requesting any changes to the flagged temporary subscriber record in the MSC, and determining in the HLR whether the subscriber profile associated with the flagged temporary subscriber record in the MSC is flagged in the HLR. If the associated subscriber profile in the HLR is not flagged, the HLR sends a message to the MSC indicating that there are no changes to the flagged temporary subscriber record in the MSC. However, if the associated subscriber profile in the HLR is flagged, the HLR sends to the MSC, the changes to the flagged temporary subscriber record in the MSC. The MSC then updates accordingly, the temporary subscriber records. The MSC and the HLR then remove the flags from the subscriber record and profile.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 1 (Prior Art) is a flow chart of an existing method of performing and recovering from a restart in a mobile switching center (MSC)

DETAILED DESCRIPTION OF EMBODIMENTS

Figure 2A:
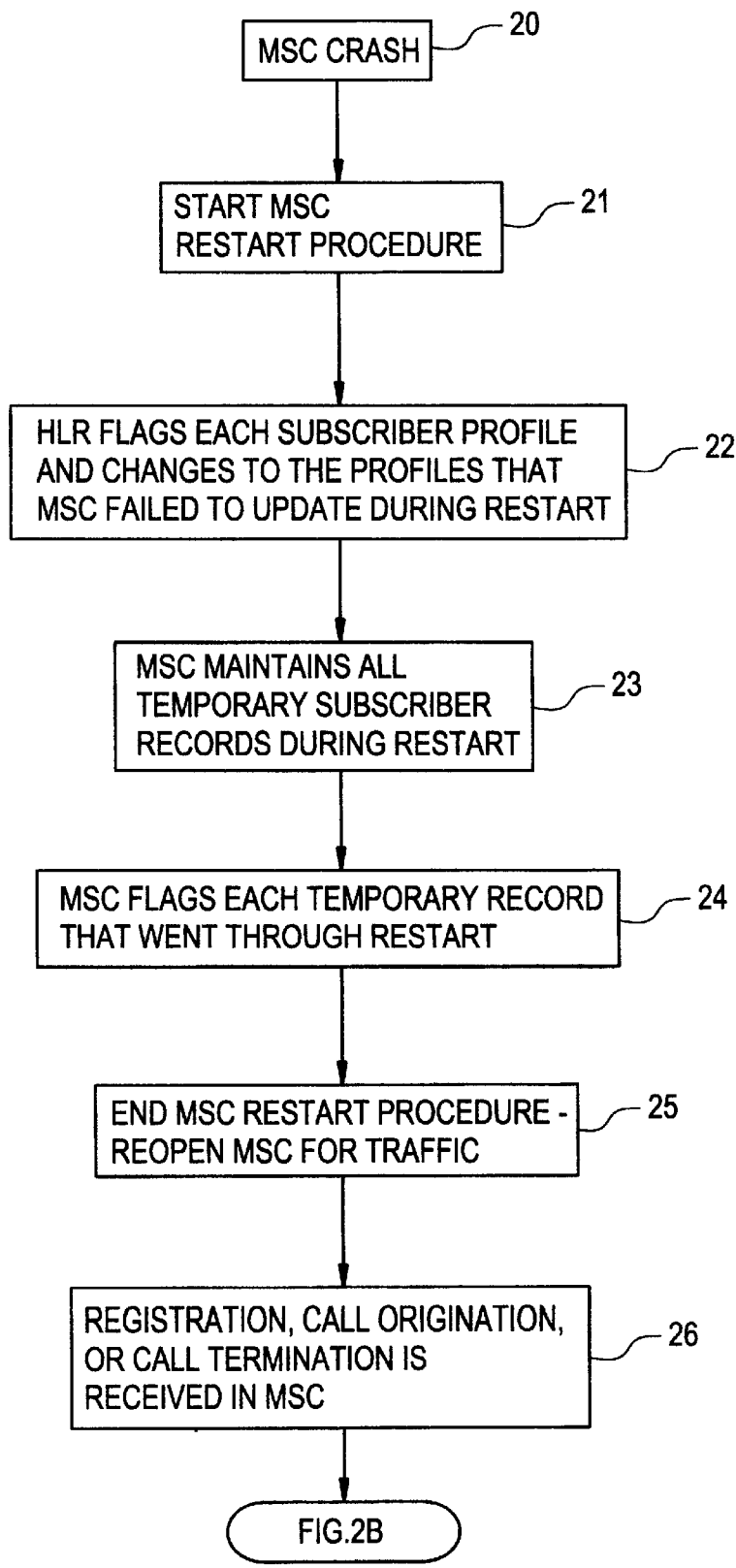
FIGS. 2A and 2B are a flow chart of a method of performing and recovering from a restart in a mobile switching center (MSC) in accordance with the teachings of the present invention.

The present invention reduces the load on the MSC following a restart by minimizing the data transferred between the HLR and the MSC, and greatly reducing or eliminating the requirement to delete and replace temporary subscriber records in the MSC. The present invention reduces the load on the MSC and on signaling links between the MSC and the HLR, while ensuring that no inconsistencies exist between temporary records in the MSC and the subscriber profiles in the HLR.

In the present invention, if the HLR tries to update a temporary subscriber record during the restart, but the MSC does not respond to the QUALDIR message, the HLR flags the changes to the subscriber profile in the HLR. In addition, the present invention does not delete the temporary subscriber records in the MSC, but rather maintains the temporary records during the restart and flags each temporary record to identify it as a record that went through a restart. At the next access for any subscriber with a temporary record that is flagged in the MSC, the MSC adds a new bit to the Registration Notification (REGNOT) message which is sent from the MSC to the HLR. The new bit sets a Qualification Information Code (QIC) parameter to "Validation", and requests the HLR to send to the MSC any changes that occurred to the subscriber's profile during the restart. The HLR checks the subscriber profile in the HLR, and if the profile in the HLR has not been flagged, then the HLR merely responds to the MSC that there have been no changes. In this case, the MSC utilizes the existing temporary record in the MSC to service the call.

However, if the profile has been flagged due to a failed update attempt, the subscriber profile may be sent from the HLR to the MSC where it replaces the incorrect temporary record. Preferably, however, only the changed portion of the subscriber profile is sent to the MSC where it updates the incorrect temporary record. This saves the time and processor load required to process the subscriber categories and copy them into the temporary subscriber record. All subsequent registrations and call attempts for the subscribers are treated normally.

FIG. 1 is a flow chart of an existing method of performing and recovering from a restart in a MSC. At step 10, an application error may cause the MSC to crash, or the system operator may initiate a restart procedure. At step 11, the restart procedure is begun. If the restart is a large restart, the process moves to step 12 where all temporary subscriber records in the MSC are immediately cleared. When the restart is completed, the process moves to step 13 where the restart procedure ends and the MSC is reopened for traffic. The procedure then moves to step 17. If the restart is a small restart, the process moves instead from step 11 to step 14 where the MSC immediately clears only the temporary subscriber records that are not related to ongoing calls that are stable. At step 15, the ongoing calls are continued, and the MSC flags the temporary records associated with subscribers engaged in those calls. At step 16, the MSC restart is completed, and the MSC is reopened for traffic. Whenever any of the ongoing calls are completed, the flagged records associated with those subscribers are cleared.

Since the restart takes approximately 1.5 minutes to complete, and no registrations and no new calls are allowed during the restart, there is often a flood of registrations and call traffic when the MSC reopens to traffic. At step 17, the MSC sends a Registration Notification (REGNOT) message to the HLR to fetch the subscriber profile for each subscriber attempting a call or registration after the restart. At step 18, the MSC must create a new temporary subscriber record utilizing the subscriber profile information retrieved from the HLR. This leads to a massive increase in load on the MSC, and heavy signaling traffic between the MSC and the HLR as the deleted temporary subscriber records are replaced. This increased load can continue for an extended period of time due to the buildup of unregistered mobile stations and repeated call attempts. This results in service degradation and processing inefficiency as a substantial portion of the processors capacity is being utilized to shed calls. As noted above, if this increased load continues for an extended period, service to end users may continue to be adversely impacted.

Figure 2B:
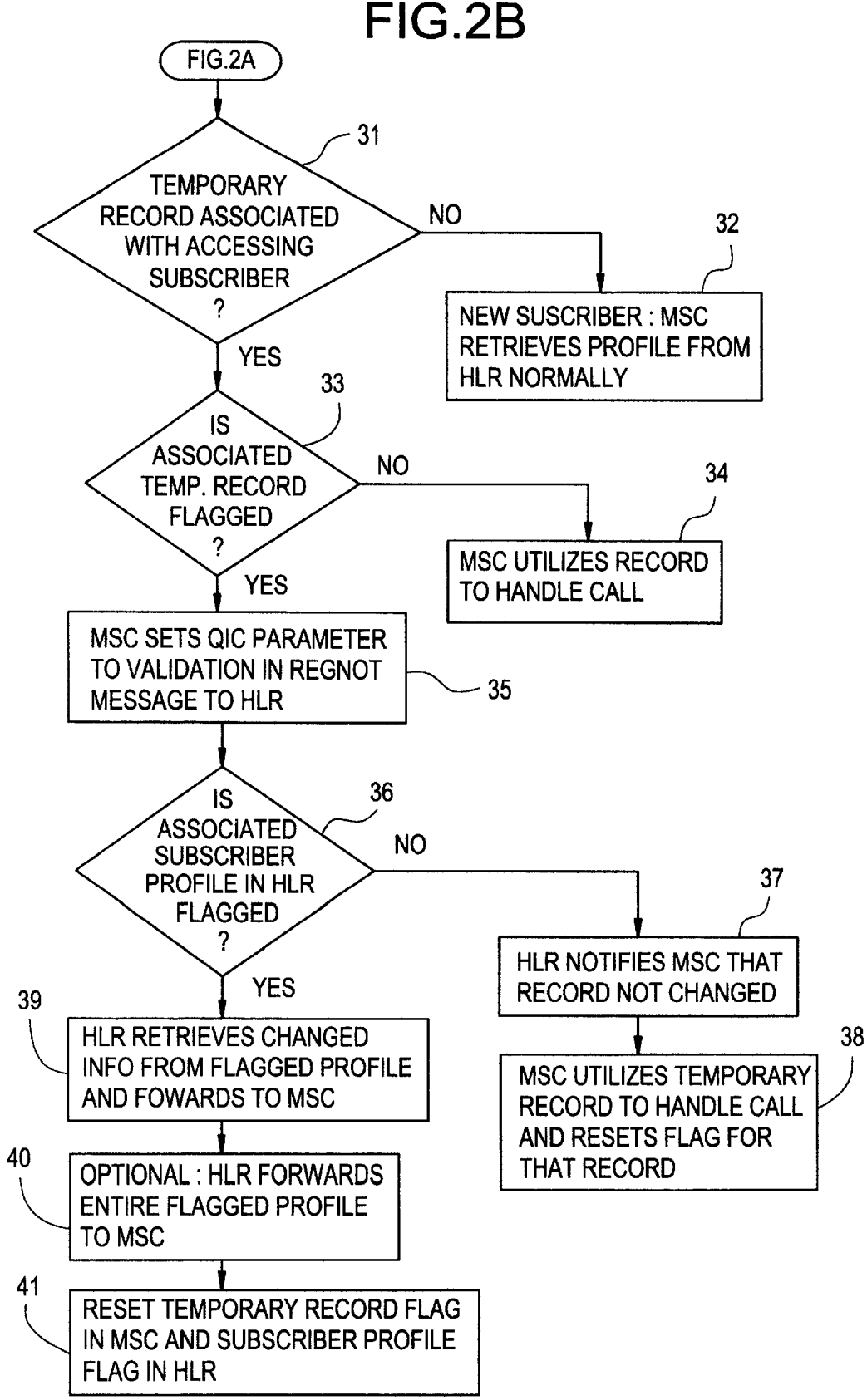

FIGS. 2A and 2B are a flow chart of a method of performing and recovering from a restart in a mobile switching center (MSC) in accordance with the teachings of the present invention. At step 20, an application error may cause the MSC to crash, or the system operator may initiate a restart procedure. At step 21, the restart procedure is begun. At step 22, it is noted that throughout the restart procedure, the HLR may send QUALDIR messages to the MSC attempting to update the MSC's temporary subscriber records. However, these update attempts fail since the MSC is performing a restart. Whenever an update attempt fails, the HLR flags the associated subscriber profile in the HLR, and the changes to the profile, to indicate that an update attempt for that record failed.

At step 23, it is noted that the temporary subscriber records in the MSC are not cleared, but rather the MSC maintains the temporary subscriber records during the restart. As the MSC restart is being completed at step 24, the MSC flags each of the temporary subscriber records to identify it as a record that went through the restart. At step 25, the MSC restart is completed, and the MSC is reopened for traffic. At step 26, an access such as a registration, call origination, or call termination is received in the MSC. The process then moves to FIG. 2B.

At step 31 of FIG. 2B, it is determined whether or not there is a temporary subscriber record associated with the accessing subscriber. If not, then the subscriber is a new subscriber after the restart, and the MSC retrieves the subscriber profile from the HLR normally at step 32. If there is a temporary record in the MSC, the process moves to step 33 where it is determined whether the temporary record is flagged as a record that went through the restart. If not, then the temporary record is one which has been set up since the restart, and the MSC uses the record to handle the call at step 34. If, however, the associated temporary record is flagged as a record that went through the restart, the process moves from step 33 to step 35 where the MSC sets the QIC parameter to "Validation" in a REGNOT message to the HLR. Upon receiving the REGNOT message and QIC parameter in the HLR, the HLR determines at step 36 whether or not the associated subscriber profile in the HLR is flagged as a record for which an update attempt failed during the restart. If not, the HLR merely responds to the MSC at step 37 that there have been no changes. In this case, the existing temporary record in the MSC is utilized at 38, and the MSC then resets the flag for that record.

However, if the record has been flagged due to a failed update attempt, the process moves to step 39 where the HLR may be programmed to send only the changed portion of the subscriber profile to the MSC. In yet another embodiment, the HLR sends the entire subscriber profile to the MSC at step 40 where it replaces the incorrect temporary record. There is still a substantial reduction in processor load and signaling load over the prior art even if the entire profile is sent, since only records that failed an update attempt are being sent to the MSC. Once the temporary record has been updated or replaced, the process moves to step 41 where the flags for the temporary record in the MSC and the associated subscriber profile in the HLR are reset.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network having a home location register (HLR) that maintains subscriber profiles for subscribers in the network and a mobile switching center (MSC) that maintains temporary subscriber records associated with subscribers roaming in the MSC's service area, a method of recovering from a restart procedure in the MSC, said method comprising the steps of:

maintaing the temporary subscriber records in the MSC during the restart procedure;

identifying temporary subscriber records that went through the restart procedure;

MSC identifying subscriber profiles in the HLR that failed attempts to update associated temporary subscriber records in the MSC during the restart procedure; and updating only the identified temporary subscriber records from the identified subscriber profiles after the restart procedure is completed.

2. The method of recovering from a restart procedure in the MSC of claim 1 wherein the step of identifying subscriber profiles in the HLR that failed attempts to update associated temporary subscriber records in the MSC during the restart procedure includes the steps of:

receiving an update to a subscriber profile in the HLR;

attempting to update an associated temporary subscriber record in the MSC;

obtaining no response from the MSC; and flagging the subscriber profile in the HLR.

3. The method of recovering from a restart procedure in the MSC of claim 2 wherein the step of identifying temporary subscriber records that went through the restart procedure includes flagging the temporary subscriber records that went through the restart procedure.

4. The method of recovering from a restart procedure in the MSC of claim 1 wherein the step of updating only the identified temporary subscriber records includes the steps of:

receiving an access attempt in the MSC that requires use of an identified temporary subscriber record in the MSC;

sending a message from the MSC to the HLR requesting any changes to the identified temporary subscriber record in the MSC;

determining in the HLR whether the subscriber profile associated with the identified temporary subscriber record in the MSC is an identified profile in the HLR; and sending from the HLR to the MSC, the changes made to the subscriber profile during the restart, upon determining that the associated subscriber profile in the HLR is an identified profile.

5. The method of recovering from a restart procedure in the MSC of claim 4 further comprising, after the step of sending the changes made to the subscriber profile from the HLR to the MSC, the steps of:

resetting the flagged temporary records in the MSC; and resetting the flagged subscriber profiles in the HLR.

6. The method of recovering from a restart procedure in the MSC of claim 1 wherein the step of updating only the identified temporary subscriber records includes the steps of:

receiving an access attempt in the MSC that requires use of an identified temporary subscriber record in the MSC;

sending a message from the MSC to the HLR requesting any changes to the identified temporary subscriber record in the MSC;

determining in the HLR whether the subscriber profile associated with the identified temporary subscriber record in the MSC is an identified profile in the HLR; and sending the associated subscriber profile from the HLR to the MSC, upon determining that the associated subscriber profile in the HLR is an identified profile.

7. The method of recovering from a restart procedure in the MSC of claim 6 further comprising, after the step of sending the associated subscriber profile from the HLR to the MSC, the steps of:

resetting the flagged temporary records in the MSC; and resetting the flagged subscriber profiles in the HLR.

8. The method of recovering from a restart procedure in the MSC of claim 1 further comprising the step of notifying the MSC that there are no changes to the identified temporary subscriber records in the MSC, upon determining that the associated subscriber profiles in the HLR are not identified profiles.

9. The method of recovering from a restart procedure in the MSC of claim 8 further comprising, after the step of notifying the MSC that there are no changes to the identified temporary subscriber records in the MSC, the step of resetting the flagged temporary records in the MSC.

10. In a radio telecommunications network having a home location register (HLR) that maintains subscriber profiles and a mobile switching center (MSC) that maintains temporary subscriber records associated with roaming subscribers having subscriber profiles in the HLR, a method of recovering from a restart procedure in the MSC, said method comprising the steps of:

maintaining the temporary subscriber records in the MSC during the restart procedure;

flagging each temporary subscriber record in the MSC that went through the restart procedure;

flagging each subscriber profile in the HLR that fails an attempt to update an associated temporary subscriber record in the MSC during the restart procedure;

receiving an access attempt in the MSC that requires use of a temporary subscriber record that is flagged in the MSC;

sending a message from the MSC to the HLR requesting any changes to the flagged temporary subscriber record in the MSC;

determining in the HLR whether the subscriber profile associated with the flagged temporary subscriber record in the MSC is flagged in the HLR;

sending from the HR to the MSC, the changes to the flagged temporary subscriber record in the MSC, upon determining that the associated subscriber profile in the HLR is flagged;

sending a message from the HLR to the MSC indicating that there are no changes to the flagged temporary subscriber record in the MSC, upon determining that the associated subscriber profile in the HLR is not flagged;

resetting the flagged temporary records in the MSC; and resetting the flagged subscriber profiles in the HLR, upon determining that the associated subscriber profile in the HLR is flagged.

* * * * *

UNITED STATES PATENT AND TRADEMARK OFFICE
CERTIFICATE OF CORRECTION

PATENT NO.  : 6,067,454
DATED       : May 23, 2000
INVENTOR(S) : George Foti

It is certified that error appears in the above-identified patent and that said Letters Patent is hereby corrected as shown below:

Column 8, line 26, delete "HR" and substitute --HLR-- therefor.

Signed and Sealed this

Sixth Day of March, 2001

Attest:

NICHOLAS P. GODICI

Attesting Officer

Acting Director of the United States Patent and Trademark Office